US012798148B2

(12) United States Patent
Englander et al.

(10) Patent No.: US 12,798,148 B2
(45) Date of Patent: Nov. 17, 2026

(54) METHOD AND APPARATUS FOR DRY MANUFACTURING RIGID CELLULOSE PRODUCTS

(71) Applicant: Yangi AB, Varberg (SE)

(72) Inventors: Maria Englander, Lindome (SE); Marcus Corin, Tvååker (SE); Anna Altner, Veddinge (SE); Gunnar Edvardsson, Bohus-Björkö (SE)

(73) Assignee: Yangi AB, Varberg (SE)

(*) Notice: Subject to any disclaimer, the term of this patent is extended or adjusted under 35 U.S.C. 154(b) by 250 days.

(21) Appl. No.: 18/290,255

(22) PCT Filed: Jan. 17, 2022

(86) PCT No.: PCT/EP2022/050866
§ 371 (c)(1),
(2) Date: Nov. 10, 2023

(87) PCT Pub. No.: WO2022/238017
PCT Pub. Date: Nov. 17, 2022

(65) Prior Publication Data

US 2024/0239007 A1 Jul. 18, 2024

(30) Foreign Application Priority Data

May 12, 2021 (SE) .................................... 21506043

(51) Int. Cl.
*B27N 5/00* (2006.01)
*B27N 1/00* (2006.01)
(Continued)

(52) U.S. Cl.
CPC ................ *B27N 5/00* (2013.01); *B27N 1/00* (2013.01); *B27N 3/007* (2013.01); *B27N 3/14* (2013.01);
(Continued)

(58) Field of Classification Search
CPC . B27N 5/00; B27N 1/00; B27N 3/007; B27N 3/14; B27N 3/203; B27N 3/206; B27N 3/26
See application file for complete search history.

(56) References Cited

U.S. PATENT DOCUMENTS 3,518,726 A * 7/1970 Banks ............... A61F 13/15626 28/121
4,666,647 A * 5/1987 Enloe ................ A61F 13/15658 264/517
(Continued)

FOREIGN PATENT DOCUMENTS

EP 0226939 A2 7/1987
EP 3429928 B1 11/2021
(Continued)

OTHER PUBLICATIONS

International Search Report and Written Opinion for International Application No. PCT/EP2022/050866, dated May 19, 2022, 11 pages.

*Primary Examiner* — Jacob T Minskey
*Assistant Examiner* — Stephen M Russell
(74) *Attorney, Agent, or Firm* — Buchanan Ingersoll & Rooney PC

(57) ABSTRACT

An apparatus for dry manufacturing rigid cellulose products having essentially non-flat general shape comprising a disintegrating unit, a cellulose blank forming unit, and a product forming unit. The cellulose blank forming unit comprises a dispenser for guiding a cellulose fibre carrying air flow from the disintegrating unit, and a forming drum having an outer surface comprising perforations. The outer surface is configured for receiving cellulose fibres and forming a continuous or discontinuous cellulose blank, and comprises a first area having a first perforation density and a second area having a second perforation density less than the first perforation density for forming the cellulose blank with higher grammage at first locations originating from the first area than at second locations originating the said second area. The apparatus further comprises an air removing device arranged inside the forming drum, and a support
(Continued)

structure for receiving the cellulose blank from the forming drum.

16 Claims, 10 Drawing Sheets

(51) Int. Cl.

| | |
|---|---|
| ***B27N 3/00*** | (2006.01) |
| ***B27N 3/14*** | (2006.01) |
| ***B27N 3/20*** | (2006.01) |
| ***B27N 3/26*** | (2006.01) |

(52) U.S. Cl.
CPC ............. *B27N 3/203* (2013.01); *B27N 3/206* (2013.01); *B27N 3/26* (2013.01)

(56) References Cited

U.S. PATENT DOCUMENTS

| | | | | |
|---|---|---|---|---|
| 2010/0013118 | A1* | 1/2010 | Edvardsson | ...... A61F 13/15626 425/436 R |
| 2012/0037327 | A1 | 2/2012 | Alkmin et al. | |
| 2012/0040039 | A1 | 2/2012 | Alkmin et al. | |
| 2014/0039437 | A1 | 2/2014 | Van De Maele | |
| 2019/0118426 | A1* | 4/2019 | Larsson | ................ B29C 51/002 |

FOREIGN PATENT DOCUMENTS

| | | | |
|---|---|---|---|
| JP | S62206071 | A | 9/1987 |
| JP | 2019513597 | A | 5/2019 |
| SE | 1750313 | A1 | 10/2018 |
| WO | 2014142714 | A1 | 9/2014 |
| WO | 2017160218 | A1 | 9/2017 |

* cited by examiner

METHOD AND APPARATUS FOR DRY MANUFACTURING RIGID CELLULOSE PRODUCTS

CROSS-REFERENCE TO RELATED APPLICATIONS

This application is the U.S. National Phase of International Application No. PCT/EP2022/050866, filed Jan. 17, 2022, which claims priority to Swedish Application No. 2150604-3, filed May 12, 2021. The disclosure of each of these applications is incorporated herein by reference in its entirety for all purposes.

TECHNICAL FIELD OF THE INVENTION

The present invention relates in general to the field of method and apparatus for dry manufacturing of rigid cellulose products having essentially non-flat general shape. The cellulose products may be used for packaging, storing, transporting and/or displaying other products such as electronics, tools, jewelry, food, dairy products, cosmetics, etc., and/or may be used as single/multiple use disposable articles. The present invention also relates to a rigid cellulose product and to a continuous or discontinuous cellulose blank.

BACKGROUND OF THE INVENTION

There are many situations where it is desirable to provide two-dimensional (2D) or three-dimensional (3D) shaped objects made of sustainable materials. A material commonly used for packaging inserts is wet moulded pulp. Wet moulded pulp has the advantage of being considered as a sustainable packaging material, since it is produced from biomaterials and can be recycled after use. Consequently, moulded pulp has been quickly increasing in popularity for both primary and secondary packaging applications (packaging next to the article and assembly of such packages).

A common disadvantage with all wet-forming techniques is the need for large amounts of water during manufacturing and the need for drying of the moulded product, which is a time and energy consuming step leading to low production speed and substantial high investment cost in machines and tooling. Meaning that the technology will not be feasible to replace fossil-based alternatives in large scale.

Moreover, many modern lean production lines require in-line on-demand package or component manufacturing where a wet-forming process is not preferred or feasible. Lately, new fibre-based materials have been developed with the purpose of enabling dry forming of three-dimensional objects/products. One approach is disclosed by WO2014/142714. WO2014/142714 discloses a dry-laid composite web being an intermediate product for thermoforming of three-dimensionally shaped objects, comprising 40-95 wt-% CTMP fibres, 5-50 wt-% thermoplastic material, and 0-10 wt-% additives, wherein the dry-laid composite web has been impregnated with a dispersion, an emulsion, or a solution containing the thermoplastic material, polymer, and dried, obtaining a density of 50-250 kg/m3, or, if compressed by calendaring 400-1000 kg/m3. According to WO2014/142714, bonding of the polymer is activated by the higher temperature applied in the thermoforming process and contributes to the final strength of the thermoformed object.

Forming a sheet of cellulose fibres in an air/dry-laid process provides in general a weak network strength of said cellulose fibres, i.e., weak self-supporting properties. Said air laid sheet/blank may be an intermediate product in a dry cellulose forming/manufacturing process of essentially non-flat products. Due to the fragile character of said intermediate product it may be necessary to improve its self-supporting properties of said sheet to improve the efficiency and flexibility of the manufacturing process of said rigid cellulose products having essentially non-flat general shape.

It has been identified that the cellulose fibres are very hygroscopic and that the air/dry-laid process is sensitive to electrostatic charges and process conditions such as airflow and humidity. This behaviour of the cellulose fibres makes it difficult to provide an even blank/sheet of cellulose fibres onto a forming structure/web because the cellulose fibres tend to group together and the grammage/thickness of the blank will become uneven/unpredictable. There are attempts within the art to provide a solution of controlling the properties/grammage of the cellulose blank, i.e. using a tower forming unit as in SE1750313 wherein fibre separating brushes and first compacting rollers are used to try to obtain a uniform cellulose blank, both in the axial and transverse directions. Uneven grammage of the cellulose blank may to some degree be compensated with isostatic pressing procedure according to EP3429928. However, this is more complicated in terms of tooling, requires longer process times and is a more complex process. The problem with this formation tower and isostatic pressing process is that it is rather complex with all its mechanical components provided for distributing as even as possible layer of cellulose fibres onto the forming web. A common problem in the pressing step for forming a 3D shaped component/product is that the sheet/blank of cellulose fibres may crack due to complex component structure/design and/or deep products.

There is a need in the art for a more reliable dry cellulose forming/manufacturing process of essentially non-flat rigid cellulose products which reduce or eliminates the risk of creating cracks in the pressing step.

OBJECT OF THE INVENTION

The present invention aims at obviating the aforementioned and other disadvantages and failings of previously known methods and apparatus for dry manufacturing rigid cellulose products, and at providing an improved method and apparatus for dry manufacturing rigid cellulose products having essentially non-flat general shape.

A primary object of the present invention is to provide an improved method and apparatus for dry forming/manufacturing rigid cellulose products having essentially non-flat general shape from cellulose fibres. It is another object of the present invention to provide a method and apparatus for manufacturing rigid cellulose products that entails that the produced cellulose products are free from cracks that otherwise originating from the pressing of the cellulose product. It is another object of the present invention to provide a method and apparatus for manufacturing rigid cellulose products wherein the grammage of the cellulose blank may be tailored in order to obtain final cellulose products having required characteristics/properties such as rigidity, thickness, grammage, etc. It is another object of the present invention to provide a method and apparatus for manufacturing rigid cellulose products that may produce a continuous or discontinuous cellulose blank. It is another object of the present invention to provide a method and apparatus for manufacturing rigid cellulose products that generates less scrap/waste. It is another object of the present invention to provide a method and apparatus for manufacturing rigid cellulose products wherein the blank forming unit is made less complex.

SUMMARY OF THE INVENTION

According to the invention at least the primary object is attained by means of the initially defined method and apparatus having the features defined in the independent claims. Preferred embodiments of the present invention are further defined in the dependent claims.

According to a first aspect of the present invention, there is provided an apparatus comprising:

- a disintegrating unit for providing a quantity of separated cellulose fibres from a cellulose raw material,
- a cellulose blank forming unit comprising:
  - a dispenser for guiding a cellulose fibre carrying air flow from the disintegrating unit,
  - a forming drum having an outer surface comprising perforations, wherein the outer surface is configured for receiving cellulose fibres and for forming a cellulose blank from said quantity of separated cellulose fibres transported by the air flow via the dispenser,
  - an air removing device arranged inside the forming drum, and
  - a support structure for receiving the cellulose blank formed on said forming drum,
- a product forming unit for producing rigid cellulose products having essentially non-flat general shape from the cellulose blank by pressing, wherein the apparatus is characterized in that the outer surface of the forming drum comprises a first area having a first perforation density and a second area having a second perforation density that is less than said first perforation density for forming a continuous or discontinuous cellulose blank having higher grammage at first locations originating from said first area than at second locations originating from said second area.

According to a second aspect of the present invention, there is provided a method comprising the steps of:

- providing a quantity of separated cellulose fibres by disintegrating a cellulose raw material,
- transporting the separated cellulose fibres by an air flow to an outer surface of a forming drum, wherein the outer surface of the forming drum comprises perforations,
- forming a continuous or discontinuous cellulose blank at the outer surface of the forming drum by removing air from inside the forming drum in order to temporarily retain the cellulose fibres at the outer surface of the forming drum,
- transferring the continuous or discontinuous cellulose blank from the forming drum to a support structure, and
- producing rigid cellulose products having essentially non-flat general shape by pressing the continuous or discontinuous cellulose blank in a product forming unit, wherein the continuous or discontinuous cellulose blank comprises first locations and second locations, wherein the first locations have higher grammage than the second locations, and wherein the first locations originate from a first area of the outer surface of the forming drum having a first perforation density and the second locations originate from a second area of the outer surface of the forming drum having a second perforation density that is less than said first perforation density.

Thus, the present invention is based on the insight of having non uniform perforation density on the outer surface of the forming drum such that different amount of cellulose fibres attach to different parts of the rotating forming drum and thereby the continuous or discontinuous cellulose blank may have different/varying grammage or surface weight in the axial and/or radial direction.

An advantage of the invention is that the method and apparatus provides appropriate strength and rigidity to the cellulose blank prohibiting the same to crack when producing/pressing said rigid cellulose products having essentially non-flat general shape.

Another advantage of the invention is that the grammage of the cellulose blank can be easily tailored in order to obtain the requested properties of the essentially non-flat rigid cellulose product to be produced.

According to various example embodiments of the present invention the cellulose blank is discontinuous in the axial and/or transvers directions, i.e. perpendicular and/or in parallel to the direction of movement of the support structure/web. The advantage of these embodiments is that individual strips and/or tiles of the cellulose blank, having adequate grammage in the axial and transverse directions may be formed for later use in the pressing tool for producing the essentially non-flat rigid cellulose product.

According to various embodiments of the present invention, the second perforation density of the second area of the outer surface of the forming drum is equal to zero, and as a result the grammage of the cellulose blank originating from these second areas is also zero, i.e. individual sheetlets, i.e. stripes and/or tiles, of the cellulose blank are provided.

According to various embodiments of the present invention, the outer surface of the forming drum comprises a main envelope surface and one or more recesses provided in the main envelope surface, wherein the first area having a first perforation density is located in said one or more recesses, for forming a continuous or discontinuous cellulose blank having higher grammage at the locations originating from said first area than at the locations originating from said second area.

An advantage of having recesses in the forming drum for generating the higher grammage sections of the continuous or discontinuous cellulose blank, i.e. locations having more cellulose fibres, is that it is more easily to screen/encapsulate the production step of air/dry laying cellulose fibres to the forming drum. Thereto, it is evident that the forming drum may be adapted in various ways to the final cellulose product for inter alia enforcing areas prone to crack and/or making predetermined areas of the product more rigid.

According to various embodiments of the present invention, the cellulose blank forming unit further comprises a second forming drum having an outer surface comprising perforations, wherein the outer surface is configured for receiving cellulose fibres and for forming a cellulose blank from a quantity of separated cellulose fibres transported by an air flow, and a second air removing device arranged inside the second forming drum.

The use of a second forming drum is based on the insight of providing a continuous or discontinuous cellulose blank of additional cellulose fibres that are intended to be connected to the continuous or discontinuous cellulose blank of the (first) forming drum, before the rigid cellulose product is produced/pressed. Thereby, the ability to tailor the grammage of different locations of the continuous or discontinuous cellulose blank reaching the product forming unit is further enhanced.

The cellulose fibres from the (first) forming drum and the second forming drum may be applied to the support structure concurrently as a single continuous or discontinuous cellulose blank, or individually wherein the final continuous or discontinuous cellulose blank is formed at the support structure.

According to various embodiments of the present invention the cellulose fibres of the (first) forming drum and the second forming drum are of different types, i.e. different raw material, different fibre size, different additives, etc.

The advantage of these embodiments is that the mechanical properties of the final cellulose product may be tailorized to meet specific requirements.

Further advantages with and features of the invention will be apparent from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawings, wherein.

DETAILED DESCRIPTION OF PREFERRED EMBODIMENTS OF THE INVENTION

Figure 1:
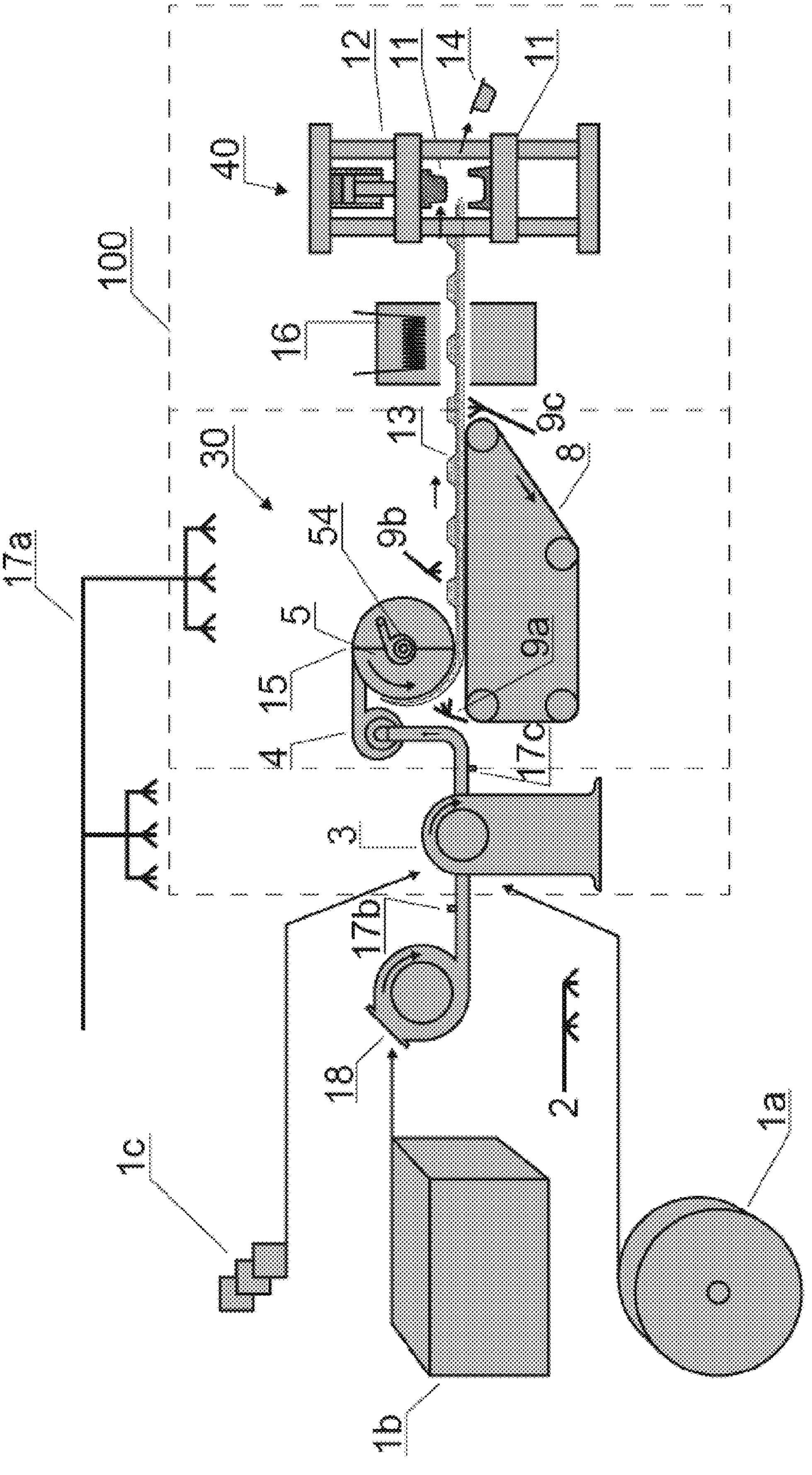
FIG. 1 is a schematic illustration of one exemplifying embodiment of an apparatus for dry manufacturing rigid cellulose products having essentially non-flat general shape from cellulose raw material, wherein the cellulose blank is continuous.

As used herein, the term "air/dry moulding or air/dry laying" means a well-known method according to which separated cellulose fibres are formed into a cellulose blank/sheet.

In air-laying, small fibres having a normal length in the range of 1 to 50 mm are separated and captured by an air stream/flow, and then laid on/applied to a forming mesh/surface, usually using a vacuum/low pressure at the other side of the mesh/surface. The terms "air laying" and "air moulding" are used interchangeably herein. The cellulose fibre carrying air flow may be generated by suitable device located upstream and/or downstream the forming mech/surface.

FIGS. 1, 3, 6, 7, 8, 9 and 10 disclose various example embodiments of an apparatus for dry manufacturing rigid cellulose products, generally designated 100, for manufacturing cellulose products 14 having essentially non-flat general shape from cellulose fibres, according to the present invention. The embodiments of the different figures may be combined.

The inventive apparatus 100 will be generally described with reference to FIG. 1, wherein said apparatus 100 comprises a separating/disintegrating unit 3, a cellulose blank/sheet forming unit 30 and a final product forming unit 40. Cellulose raw material 1 is fed to the disintegrating unit 3. The cellulose raw material 1 may be in the form of reeled pulp or paper 1*a*, bale of cellulose pulp, paper, etc. 1*b* and/or sheets of paper, cellulose pulp, etc. 1*c*. In case said cellulose raw material 1 is in the form of sheets 1*c* and/or reeled pulp or paper 1*a* it can be fed directly into the separating unit 3. However, in case said cellulose raw material 1 is in the form of a bale 1*b* or compact stacks of sheets 1*c*, etc., one or more shredders 18 and/or one or more additional separating/disintegrating units 3 may be necessary to be used for separating and dosing said cellulose raw material from said bale 1*b* or sheets 1*c* in smaller quantities. The shredder(s) 18 prepares cellulose raw material 1 to be accepted by said separating unit 3. The separating/disintegrating unit 3 disintegrates the cellulose raw material 1 into separated cellulose fibres. Said one or plurality of shredder(s) 18 are arranged upstream said one or a plurality of separating unit(s) 3, so that an output of one of said shredder 18 is connected to an input of one of said separating units 3. The shredders 18 may be arranged in parallel to each other or in series with each other, and the disintegrating units 3 may be arranged in parallel to each other or in series with each other. The shredders 18 and the disintegrating units 3 together constitute a cellulose fibre separating unit, arranged upstream the cellulose blank forming unit 30.

Said cellulose fibres may be virgin cellulose fibres and/or recycled cellulose fibres and may originate from wood pulps such as kraft pulp, sulphite pulp, mechanical pulp, thermomechanical pulp (TMP), chemical treated mechanical pulp, chemi-thermomechanical pulp (CTMP), and/or from non-wood pulps such as bagasse, bamboo, abaca, hemp, flax, cotton.

The separating unit 3 may according to various embodiments be constituted by a hammer mill. In said separating unit 3 the cellulose raw material is separated into fibres having a normal length in the range of 1 to 50 mm. The length of said fibres may be customized by adjusting the internal properties of the separating unit 3 and/or by choosing a different separating unit 3 and/or by choosing different cellulose raw material. The fibre length for wood pulp is according to various embodiments in the range 0.5-4 mm, preferably in the range 1.7-3.6 mm. According to various embodiments the fibre length for non-wood pulp is in the range 0.5-70 mm.

In an air/dry-forming/air-laid method, in general, wood pulp fibres are individualized/separated using, for example, a hammer mill, transported by an air stream via a dispenser that distributes the fibres substantially uniformly in the transverse direction of the production apparatus. The fibres are laid on a moving perforated surface using the air flow created by the vacuum/low-pressure chambers below the surface. As described above, the cellulose fibre carrying air flow may be generated by suitable device located upstream and/or downstream the perforated surface.

In FIG. 1 the individualized/separated cellulose fibres are fed to the cellulose blank/sheet forming unit 30. The cellulose blank forming unit 30 comprises in the schematic embodiment according to FIG. 1, a fan 4, a forming drum/cylinder 15 and a support structure/web 8. The fan 4 is arranged in-between said separating unit 3 and said forming cylinder 15, and the disintegrating unit 3 is connected to the fan 4. Said fan 4 generates a cellulose fibre carrying air flow and blows said cellulose fibres from said separating unit 3 onto an outer surface of said forming cylinder 15 via a dispenser extending between the disintegrating unit 3 and the forming cylinder 15. According to various example embodiments the application of said fibres onto said forming cylinder 15 is performed at an angle with respect to the outer surface of said forming cylinder 15. According to various example embodiments said angle is 90°, i.e. the fibres are applied perpendicular to the outer surface of said forming cylinder 15. According to various example embodiments said angle is smaller or larger than 90°, i.e. the cellulose fibres are applied non-perpendicular to the outer surface of said forming drum/cylinder 15. A predetermined angular interval 5 of said forming cylinder 15 is provided with vacuum/low pressure condition. The forming drum 15 is rotating continuously and at a predetermined speed, and the angular interval 5 is stationary. Thus the outer surface of the forming drum 15 passes said angular interval 5.

Separated cellulose fibres may be flowing with a fibre/air concentration of approx. 500 g cellulose fibre per cubic metre air, and the moisture content of the air is 5-20 g water/kg air in the separating unit 3 and/or in the cellulose blank forming unit 30.

The outer surface of the forming cylinder 15 is perforated. In order to apply said cellulose fibres with air onto the outer surface of the forming drum/cylinder 15 the air inside the forming drum 15 is removed in the angular interval 5, and the cellulose fibres stay attached onto the outer surface having perforations, i.e. the cellulose fibres are sucked against the outer surface of the forming drum 15. The air is removed by means of an air removing device 54 arranged inside the forming drum 15, i.e. at least a part of the air removing device 54 is arranged inside the forming drum 15. The air removing device 54 is configured to remove at least the same amount of air introduced by the fan 4 generating the cellulose fibre carrying air flow. Thereby the separated cellulose fibres will attach/accumulate to the outer surface of the forming drum 15 at the locations having perforations. When the cellulose fibres accumulate at the outer surface of the forming drum 15 the cellulose blank 13 is formed. The amount of cellulose fibres in the air flow from the fan 4, the air flow speed from the fan 4, the speed of the outer surface of the forming drum 15, the perforation density of the outer surface, etc. determine the grammage of the cellulose blank 13 formed. Alternately, the air removing device 54 also perform the task of the fan 4 and is thereby the single device generating the cellulose fibre carrying air flow.

The cellulose blank 13 is removed from the forming drum/cylinder 15 and is applied to or received by the support structure/web 8. For that reason, only said predetermined angular interval 5 of said forming cylinder 15 has said vacuum/low-pressure condition. The angular interval 5 is overlapping the air flow from said fan 4. The vacuum condition is released/terminated in advance of or at the closest position of said outer surface of said forming cylinder 15 to said support structure 8 thereby allowing said cellulose blank/sheet 13 to be released from said forming cylinder 15 and applied onto said support structure 8. The support structure 8 may be as depicted in FIG. 1 a continuous web or continuous belt. The rotational/surface speed of said forming cylinder 15 is synchronised with the speed of said support structure 8. A fan 54 may be provided in order to create under pressure inside said forming cylinder 15 at the angular interval 5.

The support structure 8 may also be a discontinuous web. Said discontinuous web may be movable back and forth for catching the cellulose blank/sheet and to deliver the cellulose blank/sheet to further process steps. This cellulose blank may be discontinuous, i.e. a stack of multiple sheetlets of the cellulose blank, or may be continuous, i.e. a folded cellulose blank.

The cellulose blank 13 fed into a product forming unit 40, either subsequently in the same line of production as the cellulose blank forming unit 30 or from an intermediate storage between the cellulose blank forming unit 30 and the product forming unit 40. According to various embodiments, the product forming unit 40 comprises a press unit 12 having a moulding tool 11. The moulding tool 11 has a male portion and a corresponding female portion comprising the design/structure of the final rigid cellulose product having essentially non-flat general shape. In FIG. 1 an optional pre-heating unit 16 is arranged upstream the press unit 12. According to various example embodiments said cellulose blank 13 may be heated to an elevated temperature before being fed into the press unit 12 of the product forming unit 40. In such embodiment(s) where the cellulose blank 13 is preheated before being fed into the press unit 12 of the product forming unit 40, said moulding tool 11 may or may not comprise heating. According to various example embodiment said moulding tool 11 in said press unit 12 may be a heated moulding tool 11 for heating said cellulose blank 13 while forming said final cellulose product 14. In the case of a heated moulding tool 11, a preheating of said cellulose blank 13 with said pre-heating unit 16 is optional. According to various example embodiments a preheating of the cellulose blank 13 in said pre-heating unit 16 is combined with a heated moulding tool 11. In such case one may heat the cellulose blank 13 to a first temperature by said pre-heating unit 16 whereas the moulding tool 11, while pressing/forming said final cellulose product 14, is heating said cellulose blank 13 to a second temperature. Said first and second temperature may be different or equal. According to various example embodiments a preheating may be performed to reach an intermediate temperature whereas the final temperature is elevated by said moulding tool 11. The intermediate temperature may be in between the final temperature and room temperature. According to various example embodiments said intermediate temperature may be close to the final temperature. Having a pre-heating unit 16 in combination with a heated moulding tool 11 will speed up the manufacturing process in the press unit 12. The pre-heating unit 16 may heat from one side, top or bottom, or both sides, top and bottom, of the cellulose blank 13. The moulding tool 11 may have one or both of said male portion and female portion heated, and/or the male portion and the female portion may have different temperature. The optional pre-heating unit 16 may be an IR heater or a resistive heater with or without a fan.

In said moulding tool 11 said cellulose blank 13 is heated to a temperature of 120-200° C. in order to obtain adequate rigidity and strength in the final cellulose product 14. According to various example embodiments the cellulose blank 13 may be preheated to 100° C. prior to reaching the press unit 12 of the product forming unit 40 and in the press unit 12 the cellulose blank is heated to 120-200° C. by said moulding tool 11. According to various example embodiments the cellulose blank is heated to 120-200° C. by said pre-heating unit 16 and no extra heat is delivered to the cellulose blank during the moulding of the final cellulose product 14. According to various example embodiment the heating of the cellulose blank 13 is only taking place in the press unit 12 of the product forming unit 40 during the forming of the final cellulose product 14, i.e. without pre-heating.

The apparatus 100 may be provided with one or a plurality of humidifier units 17*a-c*. According to various example embodiments a first humidifier unit 17*a* may be arranged to humidify the surrounding air in the production site and/or an interior volume of the apparatus 100 for ensuring the correct humidity of the cellulose fibres, especially in the disintegrating unit 3 and/or in the cellulose blank forming unit 30. According to various example embodiments a second humidifier 17*b* may be arranged prior to the separating/disintegrating unit 3, i.e. at the inlet to said separating unit 3, for humidifying the cellulose raw material entering the separating unit 3. According to various example embodiments a third humidifier 17*c* may be arranged at an outlet of said separating unit 3 for humidifying the cellulose fibres being ejected from said separating unit 3. The third humidifier 17*c* may be arranged at an inlet of the fan 4 provided for extracting fibrous material from the separating unit 3 and spraying the same fibrous material onto said forming cylinder 15. The third humidifier may also be arranged at said fan 4 for blending incoming air and fibrous material with a desired humidity before allying the cellulose fibres onto the forming cylinder 15. The humidifier 17*a*, 17*b*, 17*c* may provide water in liquid and/or gaseous form. The humidifier 17*b* and 17*c* may alternatively be used to provide other additives/chemicals than water, in liquid and/or gaseous form.

The cellulose blank requires a moisture content within a predetermined range. As mentioned above the moisture content of the air is 5-20 g water/kg air in the separating unit 3 and/or in the cellulose blank forming unit 30. According to various example embodiments the moisture content of the air is 9-12 g water/kg air in the separating unit 3 and/or in the cellulose blank forming unit 30. A too low moisture content of the cellulose fibres will result in increased risk of static electricity which will result in uneven cellulose blank formation and thereby affect the grammage of the cellulose blank. A too high moisture content will result in clogging of the cellulose fibres and thereby affect the grammage of the cellulose blank.

According to various example embodiments one or plurality of optional chemical dosing units may be provided and configured for increasing the network strength of the cellulose blank 13. In a first example embodiment at least one first chemical dosing unit 9*a-c* may be provided for applying a liquid binding agent onto a bottom or top surface of said cellulose blank for forming a support layer.

The liquid binding agent may only be allowed to have a penetration depth less than 50% of a thickness in said cellulose blank 13 from any side of said cellulose blank/sheet 13. According to various example embodiments the penetration depth of said liquid binding agent is between 5-49% of the total thickness of the cellulose blank 13. According to various example embodiments the penetration depth of said liquid binding agent is between 10-30% of the total thickness of the cellulose blank 13. The dosing unit 9*a* may apply liquid binding agent prior to receiving the cellulose blank 13 onto the support web 8. In this case the liquid binding agent is provided on a bottom side of said cellulose blank. The dosing unit 9*b* may apply liquid binding agent on top said cellulose blank 13. The dosing unit 9*c* may apply liquid binding agent prior to the optional pre-heating unit 16 and/or the press unit 12 of the product forming unit 40. In FIG. 1 the liquid binding agent is depicted to be provided on the bottom side of said cellulose blank 13. However, the liquid binding agent may additionally/alternatively at the same position as the dosing unit 9*c* below the cellulose blank be provided to the top side of the cellulose blank 13. According to various example embodiments the depicted dosing units 9*a*-9*c* may be provided alone, i.e. only one of 9*a*, 9*b*, 9*c*. According to various example embodiments the depicted dosing units 9*a*-9*c* may be provided two or more in combination i.e. 9*a* and 9*b*; 9*b* and 9*c*; 9*c* and 9*a*; or 9*a*, 9*b* and 9*c*. The liquid binding agent may be an organic or inorganic liquid. The final cellulose product 14 is in response thereto a layered product, wherein the different layers may have different properties and thickness. Increased strength and/or rigidity of the final cellulose product 14 may be achieved by adding a liquid binding agent such as starch, vegetable gums, CMC, MFC, synthetic and natural polymers, organic acids, latex, modified cellulose and/or lignin. The liquid binding agent does not comprise thermoplastic resins. The liquid binding agent may be an organic or inorganic liquid for example natural polymers or waxes extracted from plants, potassium or magnesium oxides (waterglass), silica compounds. The penetrate depth may be varied by vary the liquid binding agent pressure in said dosing units 9*a*-9*c* and/or by varying the ejection pattern of said dosing units 9*a*-9*c* and/or by varying the speed of said cellulose blank 13 and/or by varying the size of an orifice ejecting said liquid binding agent and/or by varying the number of orifices ejecting said liquid binding agent and/or by varying the duty cycle of ejection of liquid binding agent from at least one of said dosing units. Also the viscosity of the additive/agent and/or the degree of under-pressure at the other side of the cellulose blank will have direct effect on the penetration depth.

The final cellulose product 14 is formed in the press unit 12 of the product forming unit 40. The pressure by said press unit 12 onto said moulding tool 11 may be between 40-10000N/$cm^2$. According to various example embodiments said pressure is between 100-4000N/$cm^2$. According to various example embodiments said pressure is above 400N/$cm^2$, preferably between 1000-3900N/$cm^2$.

According to various example embodiments a liquid or a solid agent may be applied onto the cellulose material before the forming/moulding step for altering the hydrophobic and/or oleophobic characteristics/properties of the essentially non-flat cellulose product 14. In FIG. 1 this is exemplified by a second chemical dosing unit 2 which applies a liquid agent onto the reeled pulp or paper 1*a* before it enters the separating unit 3. The liquid or solid agent for altering hydrophobic and/or oleophobic properties of the essentially non-flat cellulose product 14 may be starch compounds, rosin compounds, butantetracarboxylic acid, gelatine compounds, alkyl ketene dimer (AKD), alkenyl succinic anhydride (ASA), wax compounds, silicon compounds and/or calcium compounds, and may be added as 0.2-15% dry content, preferably as 0.5-12% dry content. When using parallel disintegrating units 3, as will be explained hereinbelow, different chemicals/agents may be applied to the different raw cellulose material 1 that is feed into the individual disintegrating units 3.

According to various example embodiments the moisture content of the cellulose blank 13 is at least 5% when said cellulose blank is provided into said moulding tool 11. According to various example embodiments said moisture content of said cellulose blank 13 is between 7-12% when said cellulose blank is provided into said moulding tool 11.

The formation of the cellulose blank 13, i.e. the control of the grammage of the cellulose blank 13 is vital for the resulting properties of the final cellulose product 14. When the design/construction of the final cellulose product 14 is complex, the prior art solutions does not provide enough rigidity/strength to the final cellulose product 14 and cracks arise during the pressing in the formation unit 40. The present invention is based on the insight that the cellulose blank 13 has to have different grammage at different locations such that the final cellulose product 14 has the required properties regarding rigidity/strength/grammage and display/comprise no cracks. By having different grammage at different locations of the cellulose blank 13 the final cellulose product 14 may have uniform grammage and/or appointed locations having elevated grammage.

In order to generate/form a cellulose blank at the outer surface of the forming drum 15 having different grammage at different locations, the outer surface of the forming drum 15 comprises a first area having a first perforation density and a second area having a second perforation density that is less than said first perforation density. Perforation density means degree of apertures area in relation to no apertures area. The dimensions of the individual perforation may be the same over the entire forming drum 15, or may differ. Since the first perforation density is higher than the second perforation density, i.e. more air will be drawn through the outer surface of the forming drum 15 at the first area than at the second area and more cellulose fibres will attach to outer surface of the forming drum 15 at the first area than at the second area. Thereby, the forming drum 15 generate a continuous or discontinuous cellulose blank 13 having higher grammage at first locations originating from said first area than at second locations originating from said second area. Higher grammage means more cellulose fibres per area of the cellulose blank 13. The forming drum 15 may have more than two levels of perforation density, and/or the interface between two areas of different perforation density may be a sharp transition or a smooth transition.

According to various embodiments the second perforation density of the second area of the outer surface of the forming drum 15 is equal to zero, i.e. no perforations and thereby no cellulose fibres will attach to the second area(s) of the outer surface of the forming drum 15. Also a small perforation density at the second perforation density of the second area of the outer surface of the forming drum 15 will entail that no significant amount of cellulose fibres will attach to the second area(s) of the outer surface of the forming drum 15.

The first area and the second area may be provided on the envelope surface of the forming drum 15. Thereby a cellulose blank 13 is formed that is discontinuous, i.e. having different grammage at different locations. Thus, at some locations the grammage is zero and at other locations the grammage is significant. Each sheetlet of the discontinuous cellulose blank 13 may have uniform grammage or areas of different grammage.

According to various embodiments, the outer surface of the forming drum 15 comprises a main envelope surface 64 and one or more recesses/ingrowths 62 provided in the main envelope surface 64. (See FIG. 5.)

Said recess(es)/ingrowth(s) 62 is suitable for creating a continuous or discontinuous cellulose blank 13 having locations/areas of different grammage. Thus, the first area of the forming drum 15 having a first perforation density is located in said one or more recesses 62, for forming a continuous or discontinuous cellulose blank 13 having higher grammage at the locations originating from said first area than at the locations originating from said second area. The location of the cellulose blank emanating from an ingrowth 64 has a higher grammage than the location of the cellulose blank emanating from surrounding areas of said outer surface of the forming drum 15 which is lacking such ingrowth.

Each recess 62 may comprise both the first area having the first perforation density and the second area having the second perforation density, and/or the recess may have different depths for the first area and the second area. Preferably, the second area having the second perforation density is located in the main envelope surface 64 and the first area having the first perforation density is located in the recesses.

Figure 2:
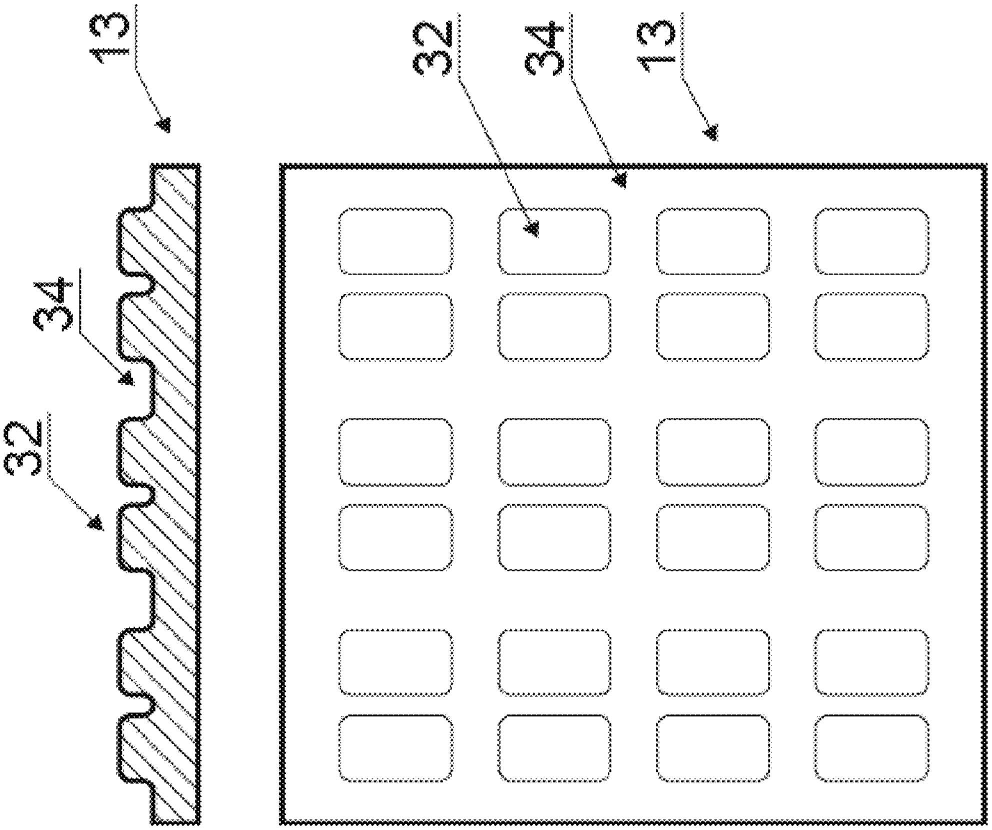
FIG. 2 is a schematic illustration of one exemplifying embodiment of a continuous cellulose blank having varying grammage in the axial and transversal directions, cross sectional view and view from above respectively.

In FIG. 1 said forming cylinder 15 may be provided with perforation in said ingrowth areas 62 as well as in the main envelope surface 64 surrounding said ingrowth(s) 62. A resulting example embodiment of a continuous cellulose blank 13 may look like the one illustrated in FIG. 2. The bottom part of FIG. 2 shows a view from above of a cellulose blank 13 and the top part of FIG. 2 shows a cross section of the same cellulose blank 13. The cross section is in a plane perpendicular to the top surface of the cellulose blank 13 and perpendicular to the movement of the cellulose blank when attached to the support structure 8. The cellulose blank 13 emanating from the forming cylinder in FIG. 1 may have an essentially flat base structure 34 on top of which protrusions of cellulose fibre are attached forming a 3D structured cellulose blank having different grammage. The protrusions 32 originates from the recesses/ingrowth(s) in said forming cylinder/drum 15. In FIG. 2 the cellulose blank is a continuous cellulose blank 13 having a 3D structure.

Figure 3:
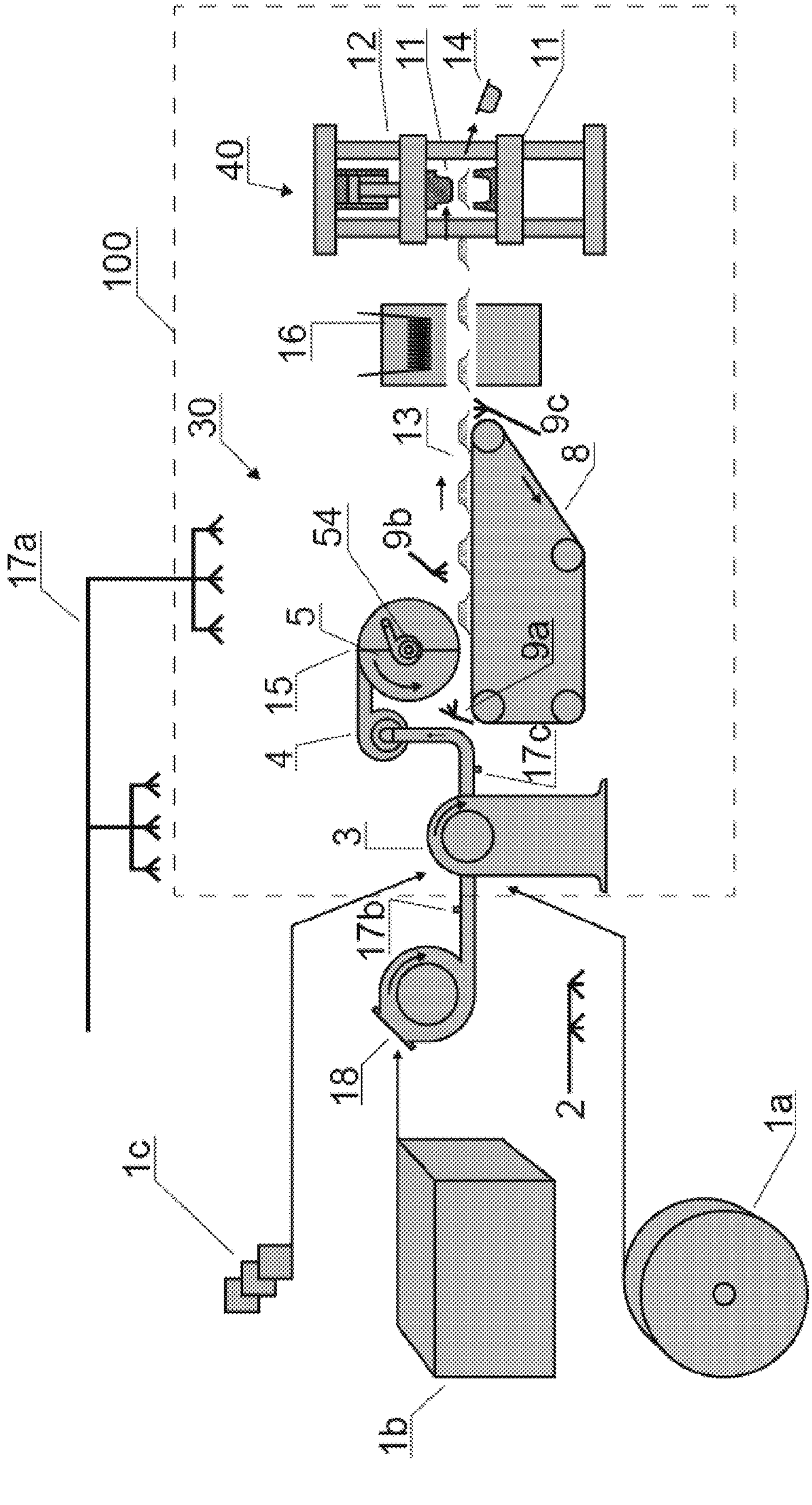
FIG. 3 is a schematic illustration of one exemplifying embodiment of an apparatus for dry manufacturing rigid cellulose products having essentially non-flat general shape from cellulose raw material, wherein the cellulose blank is discontinuous.

Reference is now made to FIG. 3 schematically illustrating an alternative example embodiment of an inventive apparatus 100 for dry manufacturing rigid cellulose products having an essentially non-flat general shape from a cellulose raw material. The difference between FIG. 3 and FIG. 1 is the design of the formation cylinder/drum 15. I FIG. 1 the formation drum 15 is configured to create a continuous cellulose blank having area(s) with higher grammage corresponding to ingrowth(s) in said formations drum 15. In FIG. 3 the formation drum 15 is configured to create a discontinuous cellulose blank, i.e. individual sheetlets 32 of the cellulose blank 13, which are not hanging together.

Figure 4:
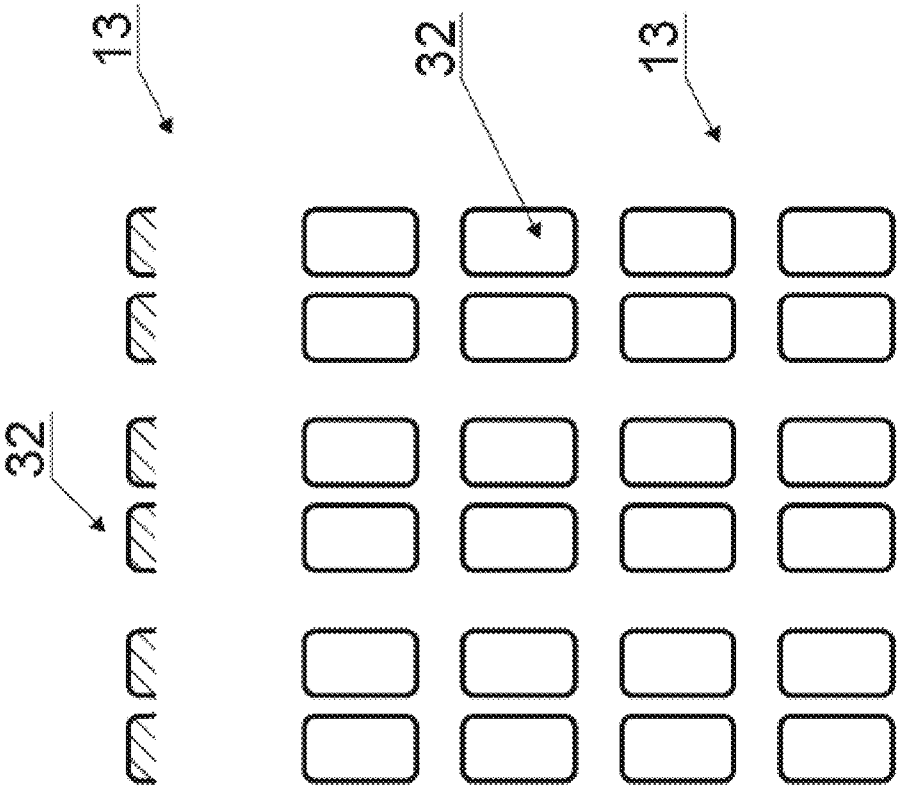
FIG. 4 is a schematic illustration of one exemplifying embodiment of a discontinuous cellulose blank in the axial and transversal directions, cross sectional view and view from above respectively.

The forming drum 15 in FIG. 3 may have perforations in said ingrowth(s) only in order to create this discontinuous cellulose blank of individual sheetlets, i.e. the first area having the first perforation density and the second area having zero or minimal perforation density. Thereby not enough cellulose fibres will accumulate at the second areas holding the individual sheetlets of the cellulose blank together. Loose cellulose fibre will not attach to said forming drum 15 not having said perforations. The perforations in the forming cylinder may create a foundation for sheet growth at the same time as surplus air is removed to the inside of the forming cylinder and distributed away from the formation process. Areas of the formation drum without perforations may have a relatively smooth surface. When loose cellulose fibre is impinging on such smooth surface without the possibility to remove the surplus of air, the cellulose fibre will have great difficulty in attaching to such areas of the formation drum 15 and thereby forming individual sheetlets 32 of the cellulose blank 13 as illustrated in FIG. 4. FIG. 4 is an example of a discontinuous cellulose blank 13. The sheetlets 32 are in FIG. 4 depicted to be separated in both axial and transversal direction seen from above. In alternative embodiments sheetlets 32 may be formed like stripes/tiles in the axial or transversal direction seen from above.

Figure 5:
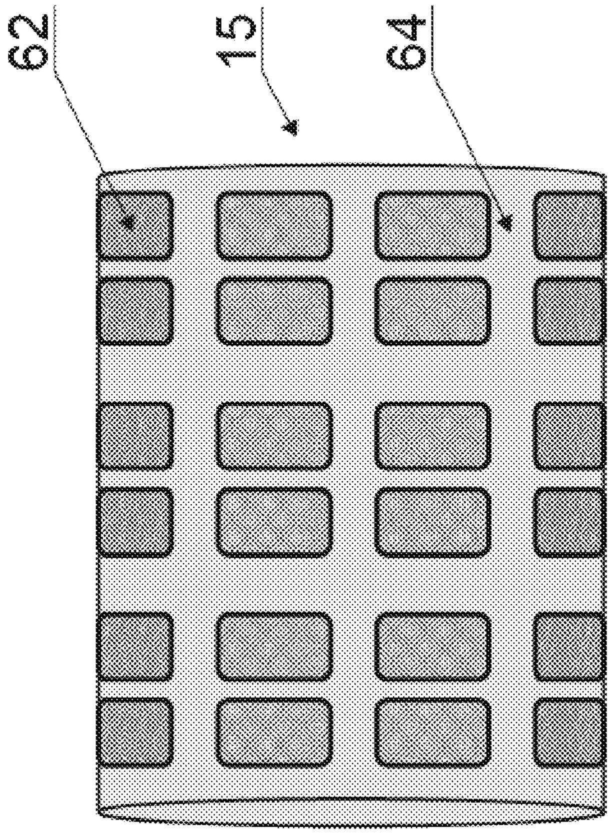
FIG. 5 is a schematic illustration of the outer surface of a forming drum having recesses in the main envelope surface.

FIG. 5 disclose an example embodiment of the outer surface of the formation drum/cylinder 15. Said formation cylinder is provided with a plurality of ingrowths 62 and main envelope surface 64 surrounding said recesses/ingrowths 62. The formation drum 15 may have perforations in said ingrowth 62 only, in said surrounding envelope surface 64 only or both in said recesses/ingrowths 62 and said envelope surface 64. The resulting shape of the cellulose blank 13 emanating from the formation drum 15 depend on the shape and number of recesses ingrowth and especially where the perforations are provided on said formation drum 15.

Figure 6:
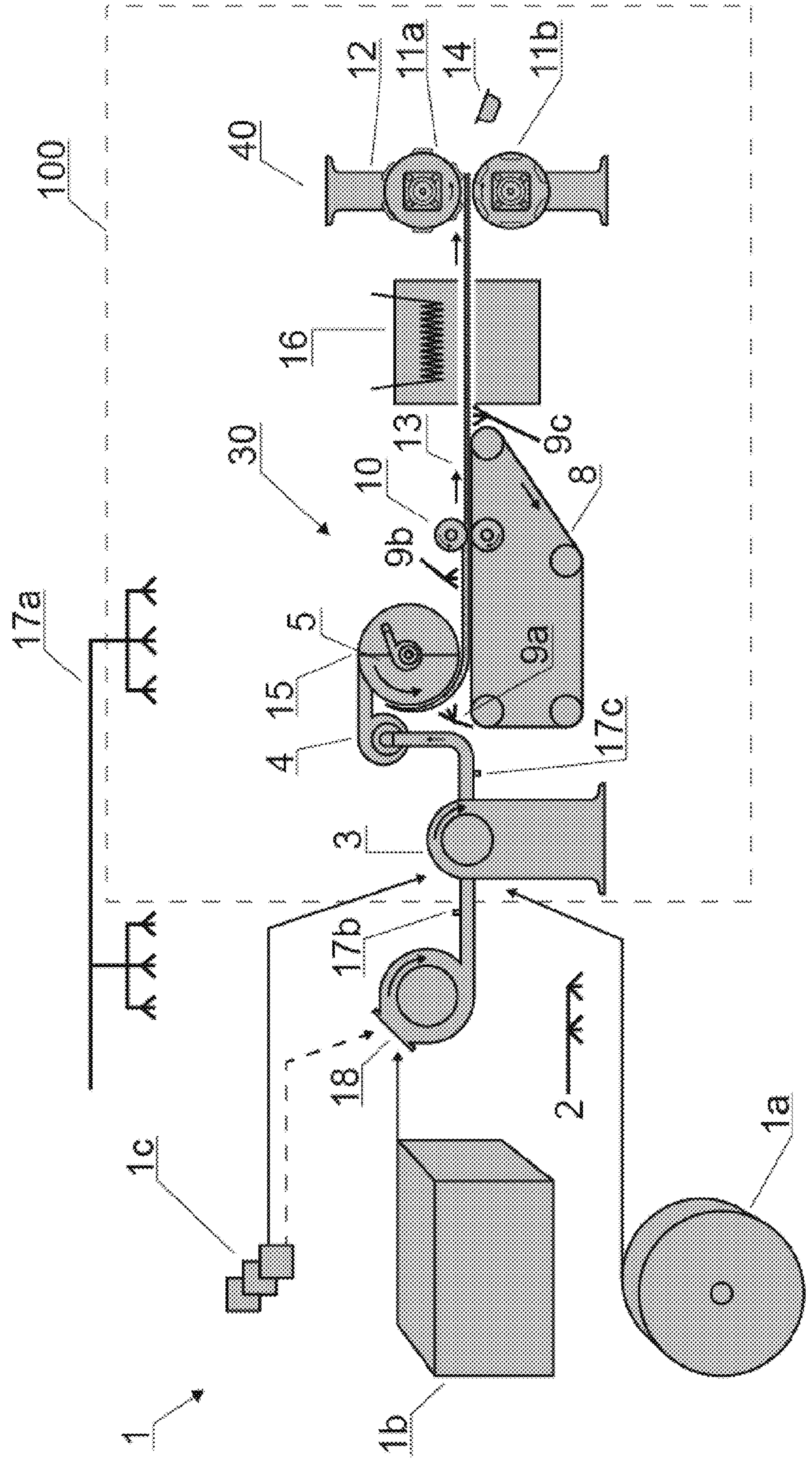
FIG. 6 is a schematic illustration of one exemplifying embodiment of an apparatus for dry manufacturing rigid cellulose products having essentially non-flat general shape from cellulose raw material, wherein the product forming unit is continuous.

In FIG. 6 schematically illustrating an alternative example embodiment of an inventive apparatus 100 for dry manufacturing rigid cellulose products having an essentially non-flat general shape from a cellulose raw material. The difference between FIG. 6 and FIG. 1 is the design of the press unit 12 and the moulding tool 11*a*, 11*b*, i.e. the product forming unit 40.

According to FIG. 1 the product forming unit 40 comprises a fixed press unit 12 with a single moulding tool 11 for manufacturing one or a plurality of three-dimensional products in a single mould/step. It shall be realised that the apparatus according to FIG. 1 may comprise parallel press units 12 and/or parallel moulding tools 11 in a single press unit 12. In FIG. 6 the product forming unit 40 is a continuous process where female and male portions are arranged on two rotating moulding units 11*a*, 11*b*. The rotation of the moulding units 11*a*, 11*b* may be synchronised with the feeding of the cellulose blank 13 into the product forming unit 40. The rotating moulding units 11*a*, 11*b* may have a plurality of parallel forms for forming the three-dimensional product. Said rotating moulding units 11*a*, 11*b* may comprise a plurality of identical forms for forming identical three-dimensional products. Said rotating moulding units 11*a*, 11*b* may comprise a plurality of different forms for forming a plurality of different three-dimensional products. The rotation of the rotating moulding units may bring forward the three-dimensional product out of the press unit 12 and feed new cellulose blank into the press unit 12. It shall be pointed out that the product forming unit 40 according to the different embodiments are 15 interchangeable without affecting the rest of the apparatus 100. According to FIG. 6 also compression rolls 10 are illustrated downstream the forming drum 15 and upstream the product forming unit 40. The compression rolls 10 are optional to the example embodiments disclosed in FIGS. 1 and 3. The compression rolls 10 may compress the air laid cellulose blank 13 to at least a half of its initial/uncompressed thickness. According to various example embodiments the compression rolls 10 are compressing the cellulose blank 13 to at least a third of its initial/uncompressed thickness. Thereby the compressed cellulose blank 13 is made more easy to handle after the cellulose blank forming unit 30, i.e. before, to and within the forming unit 40.

Reference is now especially made to FIGS. 7-10 schematically disclosing example embodiments having a multi-stage cellulose blank forming unit 30. It shall be pointed out that the herein described upstream parts and downstream parts of the apparatus 100 are combinable with the cellulose blank forming units 30 illustrated in FIGS. 7-10.

The cellulose blank forming unit 30 comprises two sub-steps, i.e. one additional forming arrangement in addition to the above described forming drum 15.

Figure 7:
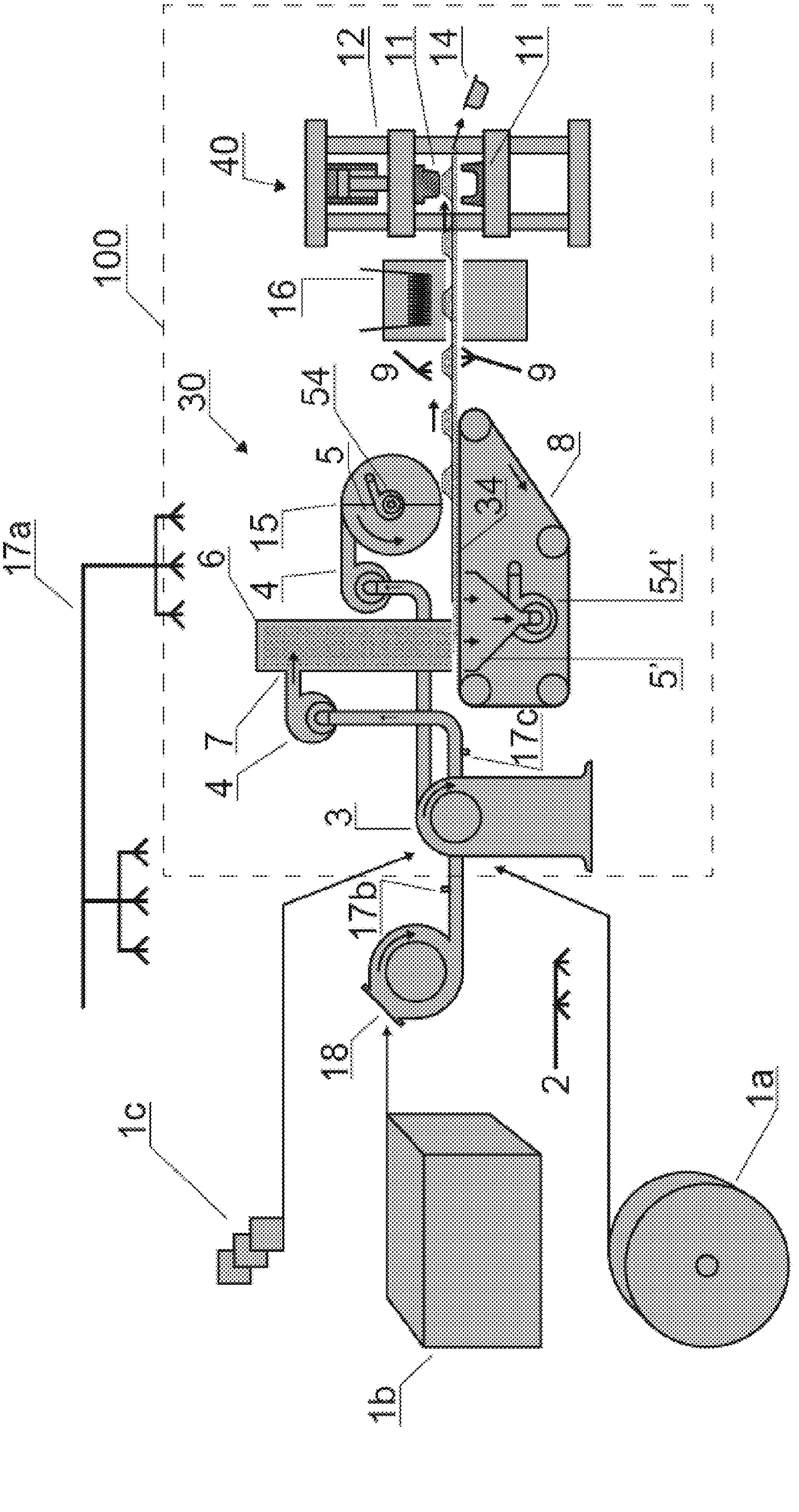
FIG. 7 is a schematic illustration of one exemplifying embodiment of an apparatus for dry manufacturing rigid cellulose products having essentially non-flat general shape from cellulose raw material, wherein the cellulose blank is generated by two forming units.

According to FIG. 7, the additional forming arrangement is constituted by a tower forming unit 7 located upstream the forming drum 15.

Separated cellulose fibres 6 are fed into the tower forming unit 7 by at least one fan 4' arranged between the separating/disintegrating unit 3 and the tower forming unit 7. Separated cellulose fibres 6 that are fed into the tower forming unit 7 are drawn towards a bottom section by a vacuum/low-pressure container 5'. The tower forming unit 7 is arranged above the continuous support structure/web 8 onto which said separated fibres 6 are to be arranged for forming the cellulose blank 13. Directly below the tower forming unit 7 and underneath the support structure 8 is said vacuum/low-pressure container 5' arranged for removing air fed into the tower forming unit 7 by means of an air-removing device/fan 54'. As the continuous support structure 8 is moving a cellulose blank 13 of a predetermined thickness 34 and grammage is arranged onto a top surface of the support structure 8. The speed of the support structure 8 in combination with the amount of separated fibres per unit air volume in the tower forming unit 7 will determine the thickness and grammage of the cellulose blank 13.

Separated fibres 6 are also fed onto the forming cylinder/drum 15 as described above. The forming drum 15 may be arranged downstream or upstream the tower forming unit 7. For instance, the formation drum 15 apply a continuous or discontinuous sheet of cellulose fibres having varying grammage, as described above, to the uniform cellulose blank originating from the tower forming unit 7. The combined cellulose blank 13 having a planar/uniform cellulose blank 34 emanating from the tower forming unit 7 and sheetlets of cellulose fibre emanating from the forming drum 15.

Thus, the forming drum 15 may produce a continuous cellulose blank as shown in FIG. 1 or a discontinuous cellulose blank shown in FIG. 3, to be added to the sheet of cellulose fibres emanating from the tower forming unit 7. According to the example embodiment disclosed in FIG. 7, the composition of the cellulose fibre from the tower forming unit 7 and the forming drum 15 is the same since the cellulose fibre are provided from one and the same separating unit 3. According to alternative embodiments the tower forming unit 7 is fed with separated cellulose fibre from a first separating unit and the forming drum 15 is fed with separated cellulose fibre from a second separating unit, as will be illustrated in FIG. 9. In such case the cellulose fibres from the first and the second separating unit may be different, as previously discussed, i.e. coming from different cellulose raw material, having different fibre length, having different agents/additives, etc.

Figure 8:
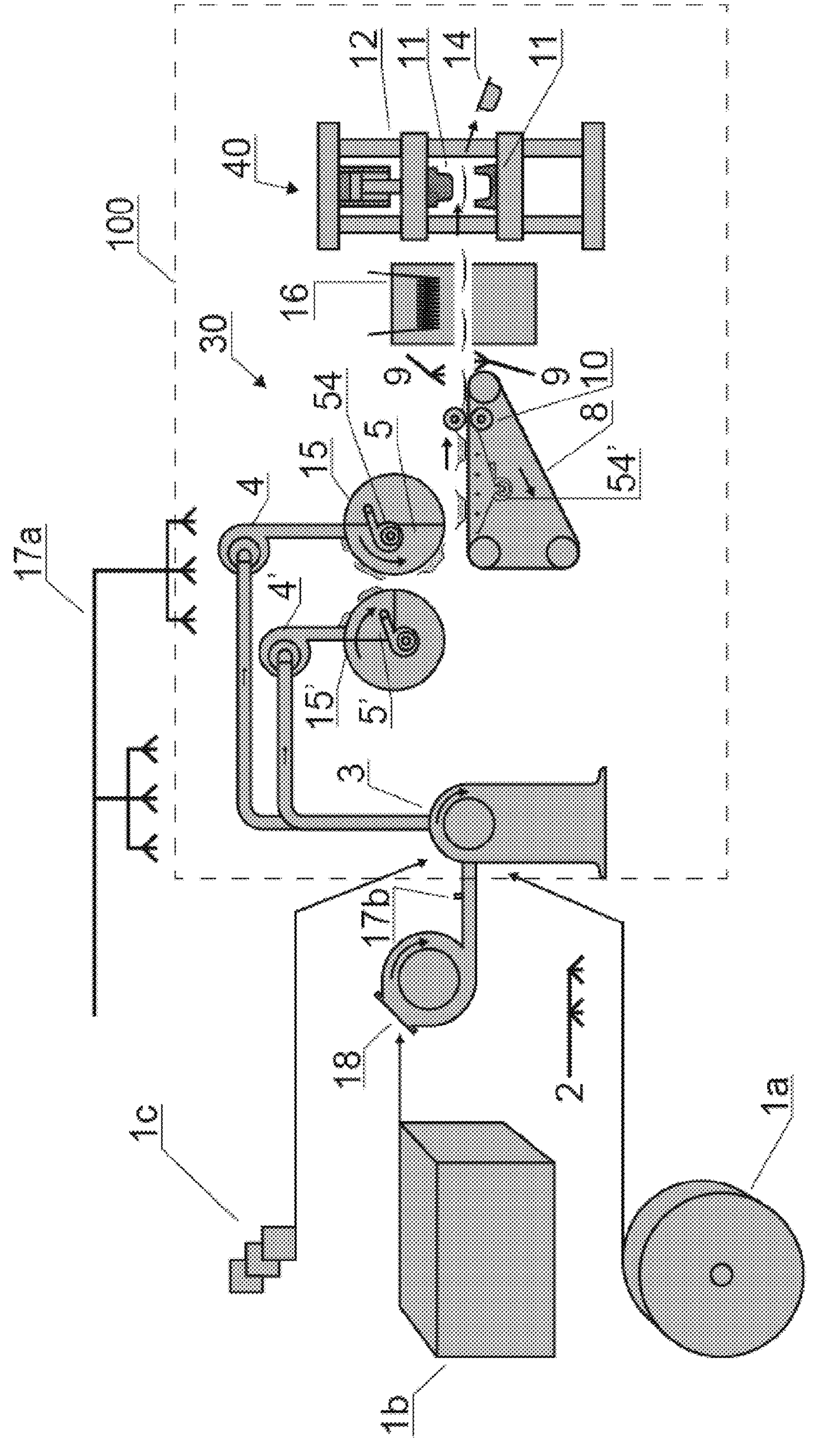
FIG. 8 is a schematic illustration of one exemplifying embodiment of an apparatus for dry manufacturing rigid cellulose products having essentially non-flat general shape from cellulose raw material, wherein the cellulose blank is generated by two forming units.

Reference is now made to FIG. 8, and in contrast to the illustrative embodiment of FIG. 7 the tower forming unit 7 is exchanged by a second forming drum 15' that is preferably configured in line with the (first) forming drum 15.

Thus, the second forming drum 15' has an outer surface comprising perforations, wherein the outer surface is configured for receiving cellulose fibres and for forming a cellulose blank 13 from a quantity of separated cellulose fibres transported by an air flow. Thereto a second air removing device is arranged inside the second forming drum 15', i.e. at least a part of the air removing device 54' is arranged inside the forming drum 15'. The second forming drum 15' may be configured as the (first) forming drum 15.

According to various embodiments, a second fan 4' for generating a cellulose fibre carrying air flow is associated to the second forming drum 15'. A disintegrating unit 3 is connected to the second fan 4', either a separate disintegrating unit or the same disintegrating unit serving the (first) forming drum 15. Thus, the outer surface of the second forming drum 15' is configured for receiving cellulose fibres and for forming a cellulose blank from said quantity of separated cellulose fibres transported by the air flow generated by the second fan 4'. Alternatively one and the same fan may be associated with both the (first) forming drum 15 and the second forming drum 15'. Alternately, the air removing device 54' also perform the task of the fan 4' and is thereby the single device generating the cellulose fibre carrying air flow associated to the second forming drum 15'.

According to the illustration in FIG. 8 the (first) forming drum 15 is located downstream the second forming drum 15', and the angular interval 5 of the forming drum 15 extends from the location of addition of cellulose fibres from the fan 4 to the location where the cellulose blank 13 is received by the support structure 8. The (first) forming drum 15 rotates in the counter clockwise direction and the second forming drum 15' rotates in the clockwise direction, and they are located adjacent each other such that at one point/interface the cellulose fibres of the two drums comes in contact. According to FIG. 8, the (first) forming drum 15 forms discontinuous sheetlets of the cellulose blank, and also the second forming drum 15' forms discontinuous sheetlets of the cellulose blank in the same way as described above together with the (first) forming drum 15. The angular interval 5' of the second forming drum 15' ends at the location/interface where the cellulose fibres of the two drums comes in contact, and the angular interval 5 of the (first) forming drum 15 is active at said location/interface. Thereby the cellulose fibres of the outer surface of the second forming drum 15' are transferred to the outer surface of the (first) forming drum 15 before the combined discontinuous cellulose blank 13 is later received by the support structure 8. FIG. 8 disclose the use of compression rolls 10 located downstream the two drums and upstream the product forming unit 40. Underneath the support structure/web 8 there is means 54' for removing air in order to have the cellulose blank 13 generated by the forming drums to become fixed to the moving support structure 8. Thereby the orientation of the sheetlets of the cellulose blank 13 is assured. This is also applicable to the embodiments of the other figures disclosing the apparatus 100.

According to an alternative illustrative embodiment, the (first) forming drum 15 is located upstream the second forming drum 15'. The second forming drum 15' may generate a continuous cellulose blank on the outer surface of the second forming drum 15', wherein the continuous cellulose blank on the second forming drum 15' may be uniform. Sheetlets of the cellulose blank are then added from the (first) forming drum 15 to the second forming drum 15' as described above, before the cellulose blank 13 having varying grammage is received by the support structure 8.

Figure 9:
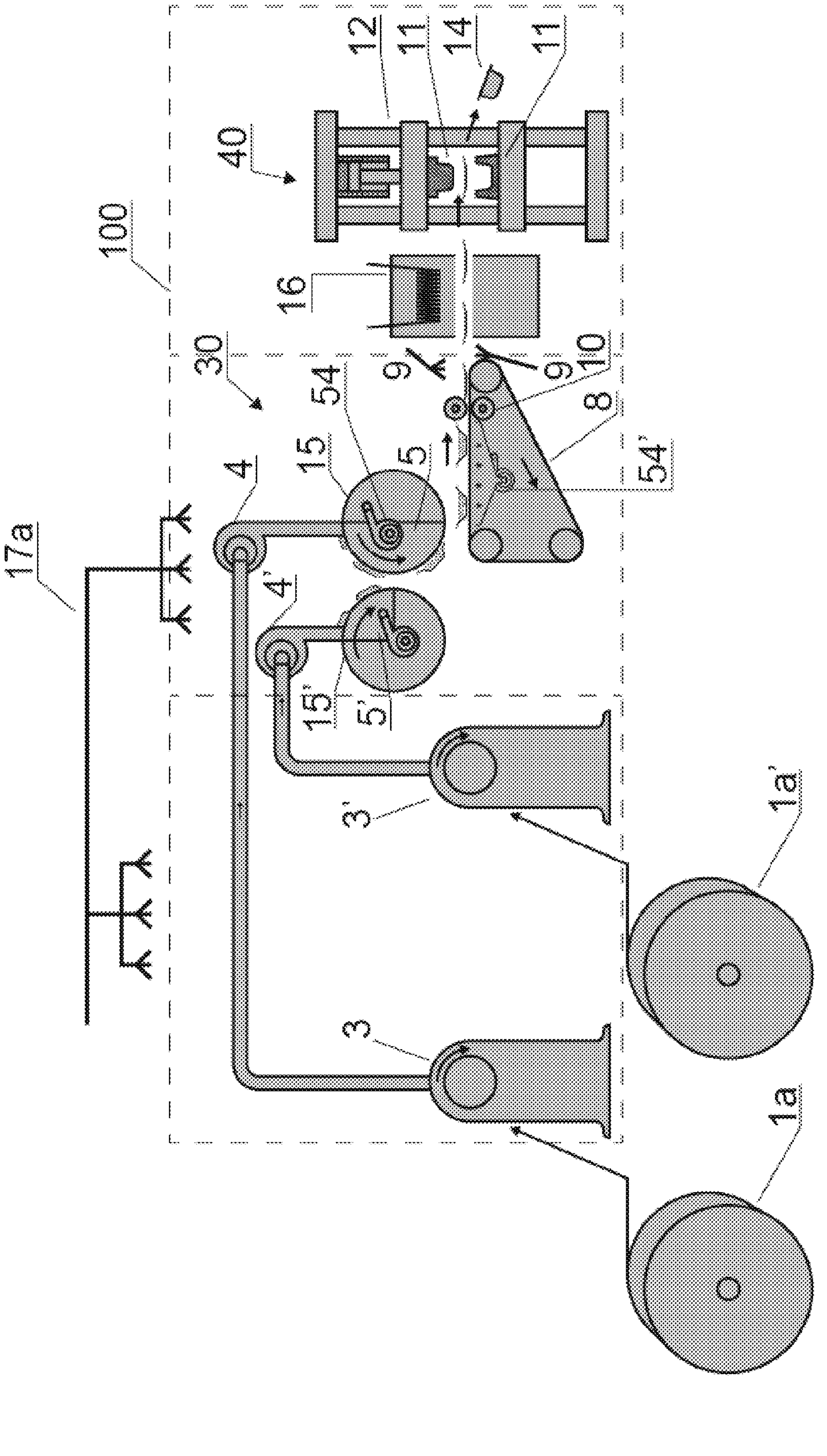
FIG. 9 is a schematic illustration of one exemplifying embodiment of an apparatus for dry manufacturing rigid cellulose products having essentially non-flat general shape from cellulose raw material, wherein different cellulose raw material are provided to two separate forming units.

Reference is now made to FIG. 9, that illustrate use of a second disintegrating unit 3' associated with the second forming drum 15'. In such case the cellulose fibres from the first disintegrating unit 3 and the cellulose fibres from the second disintegrating unit 3' may be different, as previously discussed, in order to further tailorize the properties of the final cellulose product 14. It shall be pointed out that when different disintegrating units are associated with different forming drums/units, they may also be configured to provide the same type of cellulose fibres. The different layers of the cellulose blank 13 may have different properties thanks to different additives/agents added to the different cellulose raw material, and thereby the control of the penetration depth of the additive in the final cellulose product 14 is extremely accurate.

Figure 10:
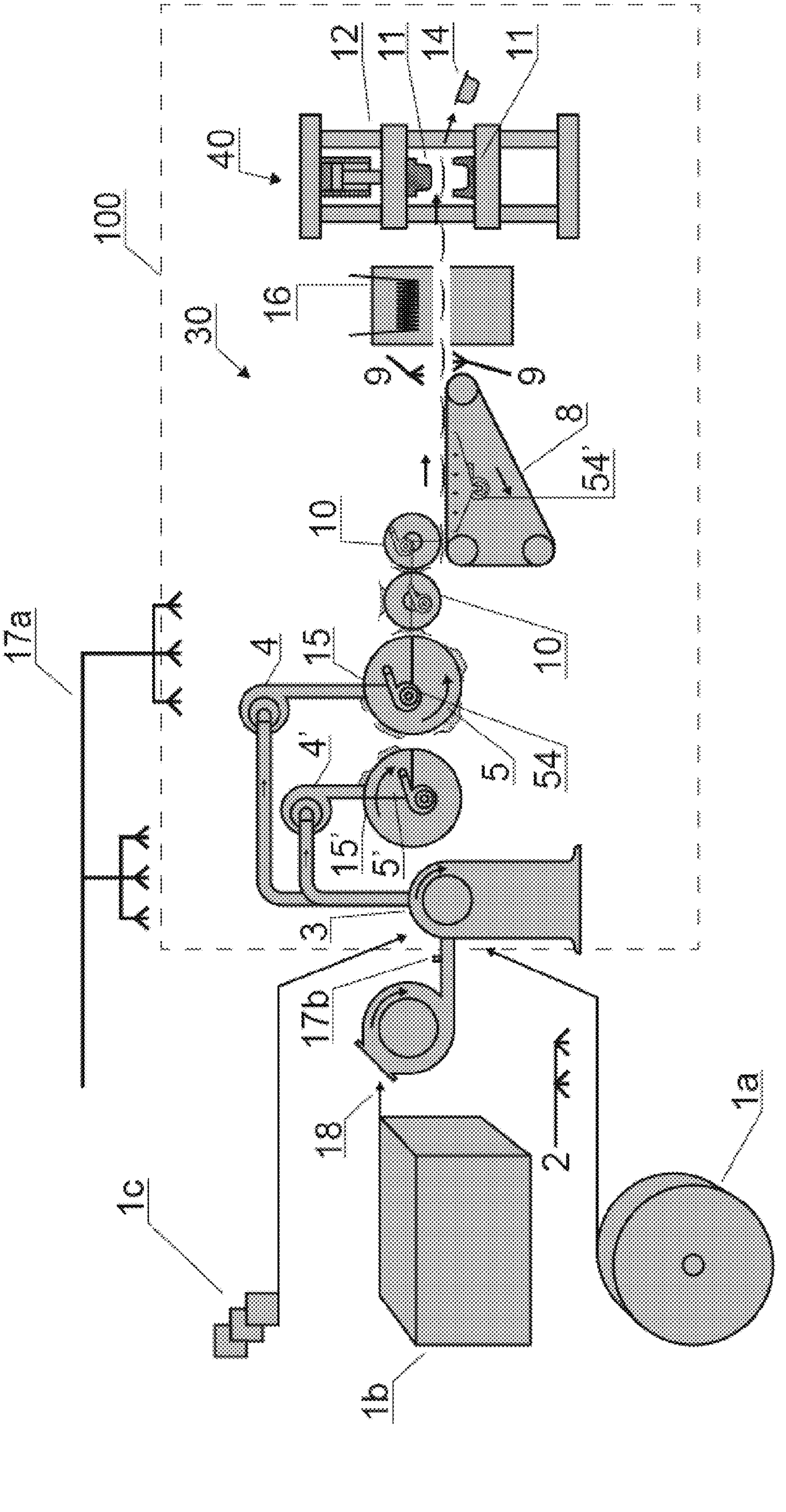
FIG. 10 is a schematic illustration of one exemplifying embodiment of an apparatus for dry manufacturing rigid cellulose products having essentially non-flat general shape from cellulose raw material, having alternative compression rolls.

Reference is now made to FIG. 10, wherein the cellulose blank forming unit 30 comprises an alternative type of compression rolls 10. The compression rolls 10 are also configured to remove the continuous or discontinuous cellulose blank 13 from the (first) forming drum 15 and transfer it to the support structure 8 at the same time as the cellulose blank 13 is compressed.

Thus, the compression rolls 10 are constituted by one or more compression drums, wherein each drum comprises perforations and air removing means arranged inside. Thereby, the cellulose blank 13 formed on the forming drum 15 is transferred to a first compression drum at a location/interface the angular interface 5 of the forming drum 15 ends and a corresponding angular interface of the first compression drum is active. The transfer from one drum to another is the same throughout the apparatus 100, i.e. one angular interval ends (under-pressure is terminated) and the next angular interval is active (under-pressure is active). A second compression drum is located close to the first compression drum such that at a location/interface they meet the continuous or discontinuous cellulose blank 13 is compressed and also transferred from the first compression drum to the second compression drum. The compressed cellulose blank may be transferred to additional compression drums before the cellulose blank is received by the support structure 8, and during such additional transferring the cellulose blank may be compressed further.

According to an alternative embodiment the second compression drum is exchanged by a compression roll, wherein the cellulose blank 13 is compressed between the first compression drum and such compression roll without transferring the cellulose blank from the first compression drum. Thereafter, the compressed cellulose blank is transferred from the first compression drum to the support structure 8.

According to various example embodiments an intermediate product for dry manufacturing at least one rigid cellulose product 14 having essentially non-flat general shape may be manufactured. Said intermediate product is constituted by a continuous or discontinuous cellulose blank 13 having first locations and second locations, wherein the first locations have higher grammage than the second locations. The grammage of the second location may be zero, etc., as discussed above. Such intermediate product may for instance be provided in the form of individual sheets or on a roll. The first locations of the cellulose blank, i.e. intermediate product, overlap with crack prone areas and/or increased rigidity areas of the following rigid cellulose product 14 having essentially non-flat general shape.

From the intermediate product, i.e. the cellulose blank 13, rigid cellulose product 14 having essentially non-flat general shape may be produced by pressing in a product forming unit 40, wherein the maximum grammage of the rigid cellulose product 14 is less than the maximum grammage of the first location of the cellulose blank 13. Thus, the cellulose fibres of the cellulose blank 13, intermediate product, will become redistributed during the pressing step in response to the non-flat general shape of the final cellulose product 14.

The periphery speed in the separating unit may be in the range of 50-150 m/s. In various example embodiments said periphery speed may be 90-150 m/s. In various example embodiments the size of the cellulose fibres may be 2 mm and the amount of fibres per unit volume air may be 100 g fibre/m3 air with 9-12 g water/kg air. The support structure, continuous forming cylinder and/or the continuous web may have a width of 20-100 cm. In various example embodiments said width is 30-70 cm. The sheet of cellulose fibre 13 may have a weight of 200-2000 g/m2. The pressure in the pressure unit may be in the range of 40-10000N/cm$^2$.

According to one example, discontinuous cellulose blank is formed on the outer surface of the forming drum 15, wherein each sheetlet is about 20 cm times 30 cm. In order to obtain a final cellulose product having a thickness of 0.5 mm, the grammage is about 600 g/m2 at the first areas and 0 g/m2 at the second areas, i.e. between the sheetlets of the discontinuous cellulose blank. The process may generate 2500 sheetlets per hour and the weight of each sheetlet is 36 g, i.e. 90 kg cellulose raw material per hour. In order to obtain about 500 g cellulose fibres per cubic meter air, the requested air flow is 180 m3 air per hour. The air speed at the outer surface of the forming drum 15 shall be about 3-5 m/s, in order to accumulate enough cellulose fibres for each sheetlet of cellulose blank.

The humidity of the air flow shall be in the range 9-12 g per kg air, preferably 11 g per kg air (equal to 14.3 g per m3 air). Depending on the humidity of the surrounding air, different amounts of water have to be added in order to obtain the requested level. The humidity of the surrounding air shall preferably be in the range 55-65% RH at 20 degrees Celsius.

According to one example, discontinuous cellulose blank is formed using two forming drums 15, 15'. A first circular cellulose blank is formed on the outer surface of the (first) forming drum 15, wherein the diameter is 40 cm and grammage is about 500 g/m2, and a second circular cellulose blank is formed on the outer surface of the second forming drum 15', wherein the diameter is 20 cm and grammage is about 200 g/m2. The process may generate 2500 sheetlets per hour and the weight of each sheetlet is 63+6=69 g, i.e. 172.5 kg cellulose raw material per hour. In order to obtain about 500 g cellulose fibres per cubic meter air, the requested air flow is 345 m3 air per hour.

REFERENCE NUMERALS

1. Raw material (cellulose)
   - 1*a* reeled pulp or paper
   - 1*b* bale
   - 1*c* sheets
2. Chemical dosing unit
3. Hammer mill (separating unit)
4. Fan (4, 4')
5. Vacuum/low-pressure container (5, 5')
6. Separated fibers
7. Tower forming unit
8. Continuous or discontinuous support structure/web
9. Chemical dosing unit
   - a. 9*a*
   - b. 9*b*
   - c. 9*c*
10. Compression rolls/drums
11. Moulding tool
12. Press unit
13. Cellulose blank
14. Final cellulose product having essentially non-flat general shape
15. Forming cylinder/drum (15, 15')
16. Heating unit
17. Humidifier
   - a. 17*a*
   - b. 17*b*
   - c. 17*c*
18. Shredder (separating unit) and dosing unit

30. Cellulose blank forming unit
32. Protrusion of cellulose fibre
34. planar structure of cellulose blank
40. Product forming unit
54. Air removing device (54, 54')
62. Ingrowth/recess
64. Envelope surface surrounding the recesses
100. apparatus for dry manufacturing rigid cellulose products Feasible Modifications of the Invention The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof. Thus, the equipment may be modified in all kinds of ways within the scope of the appended claims.

Throughout this specification and the claims which follows, unless the context requires otherwise, the word "comprise", and variations such as "comprises" or "comprising", will be understood to imply the inclusion of a stated integer or steps or group of integers or steps but not the exclusion of any other integer or step or group of integers or steps.

It shall also be pointed out that even thus it is not explicitly stated that features from a specific illustrated embodiment may be combined with features from another embodiment, the combination shall be considered obvious, if the combination is possible.

The invention claimed is:

1. An apparatus for dry manufacturing rigid cellulose products having essentially non-flat general shape, the apparatus comprising:
   - a disintegrating unit configured to provide a quantity of separated cellulose fibres from a cellulose raw material; and
   - a cellulose blank forming unit comprising:
     - a dispenser configured to guide a cellulose-fibre-carrying air flow from the disintegrating unit,
     - a cellulose blank forming drum having an outer surface comprising perforations, the outer surface:
       - configured to receive cellulose fibres and to form a continuous or discontinuous cellulose blank from the quantity of separated cellulose fibres transported by the air flow via the dispenser; and
       - comprising a first area having a first perforation density and a second area having a second perforation density that is less than the first perforation density for forming the cellulose blank with higher grammage at first locations originating from the first area than at second locations originating from the second area;

an air removing device arranged inside the forming drum, and a support structure for receiving the cellulose blank formed on the forming drum; and a product forming unit configured to produce the rigid cellulose products from the cellulose blank by pressing.

2. The apparatus of claim 1, wherein the second perforation density of the second area of the outer surface of the forming drum is equal to zero.

3. The apparatus of claim 1, wherein:

the outer surface of the forming drum comprises a main envelope surface and one or more recesses provided in the main envelope surface; and the first area having a first perforation density is located in the one or more recesses.

4. The apparatus of claim 3, wherein the second area having a second perforation density is located in the main envelope surface.

5. The apparatus of claim 1, wherein the cellulose blank forming unit further comprises:

a second forming drum having a second outer surface comprising perforations, wherein the second outer surface is configured for receiving cellulose fibres and for forming the cellulose blank from a second quantity of separated cellulose fibres transported by the air flow or a second cellulose fibre carrying air flow; and a second air removing device arranged inside the second forming drum.

6. The apparatus of claim 5, wherein the cellulose blank forming unit further comprises:

a second fan for generating the second cellulose fibre carrying air flow, wherein the disintegrating unit or a second disintegrating unit is connected to the second fan, wherein the outer surface of the second forming drum is configured for receiving cellulose fibres and for forming a cellulose blank from the second quantity of separated cellulose fibres transported by the second air flow generated by the second fan.

7. The apparatus of claim 1, wherein the product forming unit comprises a moulding tool for producing the rigid cellulose products having essentially non-flat general shape from said continuous or discontinuous cellulose blank.

8. The apparatus of claim 1, wherein the cellulose blank forming unit comprises compression rolls downstream of the forming drum, for compressing the continuous or discontinuous cellulose blank.

9. A method for dry manufacturing rigid cellulose products having essentially non-flat general shape, the method comprising the steps of:

providing the apparatus of claim 1, providing the quantity of separated cellulose fibres by disintegrating a cellulose raw material, transporting the separated cellulose fibres by an air flow to the outer surface of the forming drum, wherein the outer surface of the forming drum comprises perforations, forming the continuous or discontinuous cellulose blank at the outer surface of the forming drum by removing air from inside the forming drum in order to temporarily retain the cellulose fibres at the outer surface of the forming drum, transferring the continuous or discontinuous cellulose blank from the forming drum to the support structure, and producing rigid cellulose products having essentially non-flat general shape by pressing the continuous or discontinuous cellulose blank in the product forming unit, wherein the continuous or discontinuous cellulose blank comprises the first locations and the second locations, the first locations having higher grammage than the second locations, and the first locations originating from the first area of the outer surface of the forming drum having the first perforation density and the second locations originating from the second area of the outer surface of the forming drum having the second perforation density that is less than said the first perforation density.

10. The method of claim 9, wherein the step of forming a continuous or discontinuous cellulose blank at the outer surface of the forming drum by removing air from inside the forming drum in order to temporarily retain the cellulose fibres at the outer surface of the forming drum, comprises the sub-step of:

transferring additional cellulose fibres from a second outer surface of a second forming drum to the cellulose fibres transported by the air flow to the outer surface of the forming drum.

11. The method of claim 9, wherein the continuous or discontinuous cellulose blank is compressed downstream of the forming drum.

12. A continuous or discontinuous cellulose blank being an intermediate product for dry manufacturing at least one rigid cellulose product having essentially non-flat general shape, the continuous or discontinuous cellulose blank comprising first locations and second locations, the first locations having higher grammage than the second locations, the cellulose blank formed by means of a cellulose blank forming unit comprising:

a dispenser configured to guide a cellulose-fibre-carrying air flow from the disintegrating unit, a cellulose blank forming drum having an outer surface comprising perforations, the outer surface:

configured to receive cellulose fibres and to form the continuous or discontinuous cellulose blank from the quantity of separated cellulose fibres transported by the air flow via the dispenser; and comprising a first area having a first perforation density and a second area having a second perforation density that is less than the first perforation density for forming the cellulose blank with the higher grammage at the first locations originating from the first area than at the second locations originating from the second area;

an air removing device arranged inside the forming drum, and a support structure for receiving the cellulose blank formed on the forming drum.

13. The continuous or discontinuous cellulose blank of claim 12, wherein the first locations of the cellulose blank overlap with crack-prone areas or increased-rigidity areas of the at least one rigid cellulose product having essentially non-flat general shape.

14. A rigid cellulose product having essentially non-flat general shape, produced by a process of pressing, in a product forming unit, a continuous or discontinuous cellulose blank comprising first locations and second locations, the first locations having higher grammage than the second locations, the continuous or discontinuous cellulose blank formed by means of a cellulose blank forming unit comprising:

a dispenser configured to guide a cellulose-fibre-carrying air flow from the disintegrating unit, a cellulose blank forming drum having an outer surface comprising perforations, the outer surface:

configured to receive cellulose fibres and to form the continuous or discontinuous cellulose blank from the quantity of separated cellulose fibres transported by the air flow via the dispenser; and comprising a first area having a first perforation density and a second area having a second perforation density that is less than the first perforation density for forming the cellulose blank with the higher grammage at the first locations originating from the first area than at the second locations originating from the second area;

an air removing device arranged inside the forming drum, and a support structure for receiving the cellulose blank formed on the forming drum, wherein a maximum grammage of the rigid cellulose product is less than a maximum grammage of the first locations of the cellulose blank.

15. The rigid cellulose product having essentially non-flat general shape of claim 14, wherein:

the cellulose product comprises cellulose fibres from a cellulose raw material constituted by virgin cellulose fibres or recycled cellulose fibres; and the cellulose fibres originate from wood pulps selected from the group consisting of: kraft pulp, sulphite pulp, mechanical pulp, thermomechanical pulp, chemical treated mechanical pulp, chemi-thermomechanical pulp, and non-wood pulps.

16. The rigid cellulose product having essentially non-flat general shape of claim 14, wherein the non-wood pulps are selected from the group consisting of bagasse, bamboo, abaca, hemp, flax, or cotton.

* * * * *